Patented Apr. 5, 1949

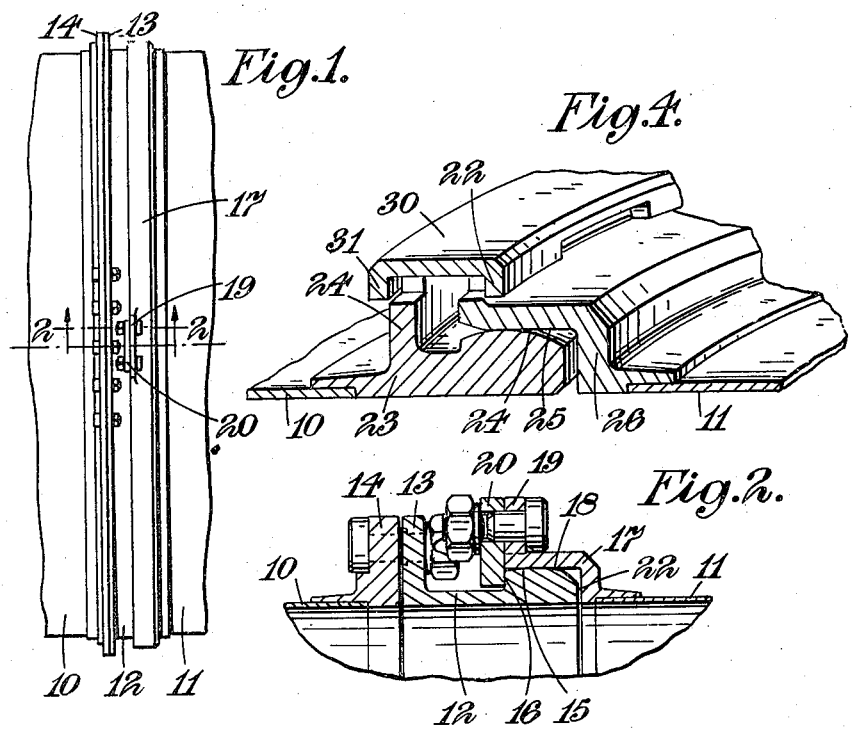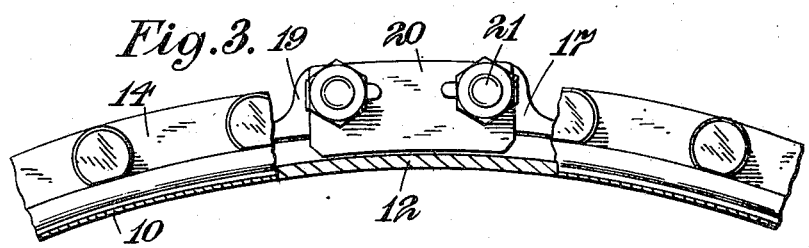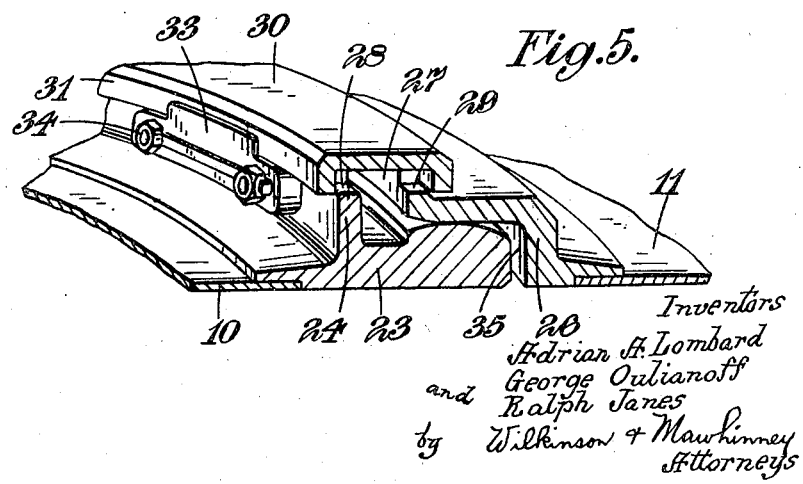

2,466,602

UNITED STATES PATENT OFFICE 2,466,602

MOUNTING OF JET PIPES IN GAS-TURBINE OR JET-PROPULSION UNITS

Adrian Albert Lombard, Clitheroe, George Oulianoff, Rimington, near Clitheroe, and Ralph Janes, Duffield, England, assignors to Rolls-Royce Limited, Derby, England, a British company Application April 29, 1947, Serial No. 744,640
In Great Britain July 16, 1946

5 Claims. (Cl. 285—175)

This invention relates to the mounting in aircraft of jet-pipes in gas-turbine or jet-propulsion units. The usual method of supporting the jet-pipe is by a shackle about half way along its length so that it can expand axially under heat. The expansion causes the exit end of the pipe to rise and fall slightly so that its other end must be mounted on the jet-propulsion unit so that it can rock to a slight extent about this end in a vertical plane.

Other forms of mounting are known which also provide for the small movements of the jet-pipe which have to be accommodated in its installation and operation.

According to the present invention a mounting for one end of a jet-pipe on another part of a gas-turbine or jet-propulsion unit comprises two cooperating annular seatings carried by the pipe and said part respectively, and having the seating face of at least one of the parts spherical or quasi-spherical about the axis of the pipe, in combination with means for locating the said end of the pipe axially with respect to, and restraining its separation from, the said part, whilst not restraining liimted relative rotational movement and limited relative tilting movement of the pipe and said part.

According to another feature of the invention, the restraining means is provided only at the opposite ends of a horizontal diameter of the pipe and each of said means permits an independent limited movement in the engaging direction of the pipe and said part.

According to another feature of the invention, the restraining means comprises a plate or plates carried by one part and engaging behind a shoulder on the other part, or in an alternative construction it comprises two castellated external flanges carried one by each seating and a ring having an inwardly directed castellated flange at each side so that it can be mounted on the aforesaid external flanges by passing its serrations between those on the external flanges and then rotating it to engage its flanges with the external flanges.

In the accompanying drawings,

Figure 1 is a side elevation showing the connection between the main part of a jet-propulsion-unit and the jet-pipe, Figure 2 is a section on the line 2—2 of Figure 1, drawn to a much larger scale, Figure 3 is a side view of Figure 2 with parts broken away, Figure 4 is a perspective diagram showing an alternative construction, and Figure 5 is a view similar to Figure 4 but from a different viewpoint.

Referring first to Figures 1 and 2, the reference 10 indicates the exhaust-pipe on the main engine-unit, and jet-pipe which has to be connected to it is indicated by 11. The connection has to be such as to provide for a limited tilting of the axis of the jet-pipe relatively to the axis of the exhaust-pipe 10 in all directions, and relative rotation whilst restraining the two parts from bodily separation. A mounting-ring 12 is provided with a flange 13 at one end whereby it is secured to a flange 14 on the end of the exhaust-pipe 10 and at its other end it is formed with an annular external seating 15 which is a double chamfer or a portion of a sphere having its centre on the axis of the ring 12 in the plane of the seating 15. The seating 15 is formed on a thickened part of the ring 12 so as to provide a shoulder 16 directed forwardly away from the rearwardly directed jet-pipe 11. A second mounting-ring 17 is secured on the forward end of the jet-pipe 11 and is formed with an inwardly directed annular seating 18 which is cylindrical about the axis of the jet-pipe and fits as a spigot over the chamfer or spherical seating 15.

The mounting-ring 17 is formed at opposite ends of a horizontal diameter with lugs 19 to each of which there is secured a plate 20 by bolts 21; these plates extend radially inward at the end of the ring 17 sufficiently to engage the shoulder 16 on the ring 12. The ring 17 is formed with an inwardly directed shoulder 22 which is aligned with the end of the ring 12 adjacent the seating 15, thereby providing a substantially continuous wall defining the conduit through which the exhaust gases flow. Relative axial movement of the exhaust-pipe 10 and jet-pipe 11 is restricted to a predetermined amount by the two plates 20, which prevent axial separation of the exhaust-pipe and jet-pipe, and a limited movement in the engaging direction is permitted by the shoulder 22 engaging the end-face of the ring 12. Each plate permits such engaging movement independently, so that a limited tilting movement is rendered possible and the clearances provided are made sufficient merely to provide the desired movement.

It will be seen that this mounting therefore permits a slight tilting movement as is required to allow for thermal expansion of the jet-pipe, and also permits relative turning movement about the axis of the jet-pipe, which occurs with certain constructions of mounting. It also allows for adjustment of the rear end of the jet-pipe in an aircraft-structure for alignment purposes and for movement due to the flexing of the aircraft-structure in flight.

In the construction illustrated in Figures 4 and 5 the ring 23 on the end of the exhaust-pipe 10 is formed with a radial flange 24 and with a spherical or quasi-spherical seating 24 to engage a cylindrical seating 25 formed on the ring 26 which is secured to the jet-pipe 11. The ring 26 is formed on its forward end adjacent the exhaust-pipe with an upstanding flange 27 which is of the same external diameter as the flange 24 on the ring 23 and these two flanges are castellated as shown at 28, 29 respectively, and they are assembled with their respective castellations in axial alignment with one another.

An external ring 30 is formed with two inwardly directed flanges 31, 32 which are castellated so as to be complementary to the castellations formed on the flanges 24 and 27, so that the ring 30 can be engaged axially with the two flanges and then turned to bring its castellations into axial alignment with those on the flanges and thereby retain the rings 23, 26 against axial separating movement. When thus assembled, the ring 30 is restrained from turning by means of a locking plate 33 which is shaped to enter one of the gaps in the flange 31 of the ring 30 and is secured by bolts or studs 34 to the flange 24.

Relative axial movement of the rings 23, 26 in a separating direction is restrained by the ring 30 and is limited in the other direction by the engagement of the shoulder 35 on the ring 26 with the end of the ring 23, in the same way as was described with reference to Figure 2. It will also be appreciated that the same limited freedom for tilting or turning of the jet-pipe 22 relatively to the exhaust-pipe 10 is provided as in the former construction.

We claim:

1. A mounting for one end of a jet-pipe on another part of a jet-propulsion unit which comprises in combination two co-operating annular seatings secured the one to the said other part and the other to the said jet-pipe respectively, the one of said seatings having an external seating-face which is a great-circle-zone of a sphere centred on a point on the axis of the part to which it is secured and the other of said seatings having an internal cylindrical seating-face cylindrical about the axis of the part to which it is secured and of the same internal diameter as the external diameter of the said spherical seating-face and means restraining said pipe and said part from axial separation whilst permitting limited tilting movement in any sense and at least limited relative rotational movement between said jet-pipe and said part.

2. A mounting for one end of a jet-pipe on another part of a jet-propulsion unit comprising a first mounting-ring secured to the said other part at one end and having an externally extending shoulder at its other end, said shoulder having its outer face formed to be a great-circle-zone of a sphere centred on the axis of said mounting-ring, a second mounting-ring secured to the said jet-pipe at one end and having at the other end an internal cylindrical surface of the same diameter as said sphere and of greater axial length than said shoulder on said first mounting-ring, and means on said second mounting-ring to have a butting engagement behind said shoulder on said first mounting-ring to restrain the mounting-rings against axial separation.

3. A mounting for one end of a jet-pipe on another part of a jet-propulsion unit comprising a first mounting-ring secured to the said other part at one end and having an externally extending shoulder at its other end, said shoulder having its outer face formed to be a great-circle-zone of a sphere centred on the axis of said mounting-ring, a second mounting-ring secured to the said jet-pipe at one end and having at the other end an internal cylindrical surface of the same diameter as said sphere and of greater axial length than said shoulder on said first mounting-ring, two lugs on said second mounting-ring at said other end thereof and disposed at opposite ends of a diameter thereof and two plates bolted one to each of said lugs to extend radially inward of said internal cylindrical surface and to engage behind said shoulder on said first mounting-ring.

4. A mounting for one end of a jet-pipe on another part of a jet-propulsion unit comprising a first mounting-ring secured to the said other part at one end and having an externally extending shoulder at its other end, said shoulder having its outer face formed to be a great-circle-zone of a sphere centred on the axis of said mounting-ring, a second mounting-ring secured to the said jet-pipe at one end and having at the other end an internal cylindrical surface of the same diameter as said sphere and of greater axial length than said shoulder on said first mounting-ring, two external castellated flanges of the same diameter, the one on said first mounting-ring and the other on said second mounting-ring, and a ring having two inwardly-directed castellated flanges one at either end thereof, to engage outside the castellations of said flanges on said mounting-rings.

5. A mounting according to claim 4, wherein said castellated ring is locked in its engaging position by a plate secured to the said flange on said first mounting-ring and engaging a recess in said castellated ring.

ADRIAN ALBERT LOMBARD.
GEORGE OULIANOFF.
RALPH JANES.

REFERENCES CITED

The following references are of record in the file of this patent:

UNITED STATES PATENTS

| Number | Name | Date |
|---|---|---|
| 727,858 | Stier | May 12, 1903 |
| 1,074,877 | Leighty | Oct. 7, 1913 |
| 1,882,616 | Hutchinson | Oct. 11, 1932 |
| 1,915,100 | McLaughlin | June 20, 1933 |
| 2,417,025 | Volpin | Mar. 4, 1947 |